United States Patent
Gretz

(10) Patent No.: US 10,923,894 B1
(45) Date of Patent: Feb. 16, 2021

(54) PUSH-IN ELECTRICAL CONNECTOR INSERTABLE FROM THE INSIDE OR OUTSIDE OF A JUNCTION BOX

(71) Applicant: Arlington Industries, Inc., Scranton, PA (US)

(72) Inventor: Thomas J. Gretz, Delray Beach, FL (US)

(73) Assignee: Arlington Industries, Inc., Scranton, PA (US)

( * ) Notice: Subject to any disclaimer, the term of this patent is extended or adjusted under 35 U.S.C. 154(b) by 411 days.

(21) Appl. No.: 15/907,354

(22) Filed: Feb. 28, 2018

Related U.S. Application Data

(60) Provisional application No. 62/549,135, filed on Aug. 23, 2017.

(51) Int. Cl.
   *H02G 3/06* (2006.01)
   *H02G 3/08* (2006.01)

(52) U.S. Cl.
   CPC .......... *H02G 3/0625* (2013.01); *H02G 3/083* (2013.01)

(58) Field of Classification Search
   CPC .......... H02G 3/08; H02G 3/081; H02G 3/083; H02G 3/085; H02G 3/0625; H02G 3/0616; H02G 3/065; F16L 5/00; F16L 5/10; F16L 5/027; H02B 1/30; H02B 1/306; H02B 1/40; H02B 1/46; Y10T 403/591; Y10T 403/60; Y10T 403/7073
   USPC .......... 403/292; 248/56, 65, 67.5, 67.7, 71, 248/74.1, 74.2, 220.31, 222.11, 222.12, 248/222.13, 224.8
   See application file for complete search history.

(56) References Cited

U.S. PATENT DOCUMENTS

| | | | | |
|---|---|---|---|---|
| 2,564,341 A | * | 8/1951 | Paige | H02G 3/065 |
| | | | | 285/154.1 |
| D251,781 S | | 5/1979 | Hutton | |
| 4,299,363 A | * | 11/1981 | Datschefski | H02G 3/083 |
| | | | | 16/108 |
| 4,474,489 A | * | 10/1984 | Simon | H02G 3/083 |
| | | | | 403/195 |
| 4,711,974 A | | 12/1987 | Borsh | |
| 4,864,080 A | | 9/1989 | Fochler et al. | |
| 4,919,370 A | * | 4/1990 | Martin | F16L 5/00 |
| | | | | 174/153 G |
| 5,118,057 A | * | 6/1992 | Martin | H02G 3/065 |
| | | | | 174/153 G |
| 5,374,017 A | * | 12/1994 | Martin | F16L 5/00 |
| | | | | 174/153 G |
| 5,442,141 A | * | 8/1995 | Gretz | H02G 3/081 |
| | | | | 174/152 G |

(Continued)

*Primary Examiner* — Amber R Anderson
*Assistant Examiner* — Alexus Camero

(57) ABSTRACT

A push-in electrical connector for connecting one or more electrical cables at a knockout of an electrical junction box or panel. The electrical connector includes a substantially tubular connector body with a sidewall, a flange, an inner body portion extending from the flange to an inner end, and an outer body portion extending from the flange to an outer end. The inner body portion includes two flexible gripper jaws and an inner seat. The outer body portion includes two compressible arms and an outer seat. The electrical connector body may include a dividing wall for maintaining separation between electrical cables. The gripper jaws and compressible arms enable secure attachment of one or more cables to an electrical panel or box.

18 Claims, 11 Drawing Sheets

(56) References Cited

U.S. PATENT DOCUMENTS

| | | | | |
|---|---|---|---|---|
| 5,693,910 A * | 12/1997 | Gretz | .................... | H02G 3/083 |
| | | | | 174/153 G |
| 6,143,982 A * | 11/2000 | Gretz | .................. | H01R 13/585 |
| | | | | 174/660 |
| 6,177,633 B1 * | 1/2001 | Gretz | .................. | H02G 15/007 |
| | | | | 174/153 G |
| 6,310,290 B1 * | 10/2001 | Gretz | .................... | H02G 3/065 |
| | | | | 174/135 |
| 6,765,148 B2 * | 7/2004 | Rix | ...................... | F16B 5/0642 |
| | | | | 16/2.2 |
| 7,211,744 B2 * | 5/2007 | Jorgensen | .............. | H02G 3/083 |
| | | | | 16/21 |
| 8,487,196 B1 * | 7/2013 | Baldwin | ............. | H01R 13/633 |
| | | | | 174/562 |
| 9,425,596 B2 * | 8/2016 | Laverdiere | ............. | H02G 3/083 |
| 9,490,617 B1 * | 11/2016 | Gretz | .................... | H02G 3/083 |
| 9,496,694 B1 * | 11/2016 | Gretz | .................... | H02G 3/085 |
| D808,907 S | 1/2018 | Gretz | | |

* cited by examiner

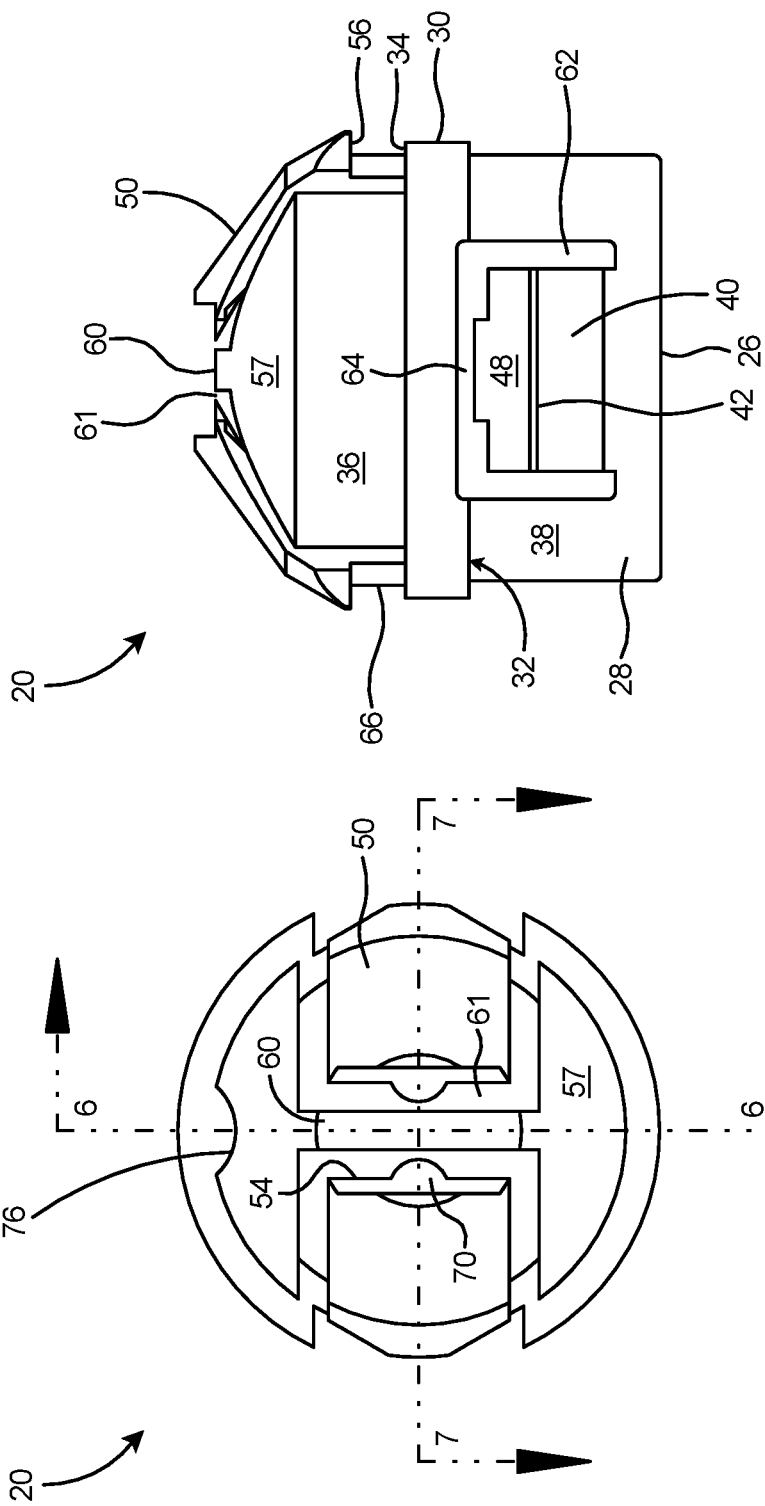

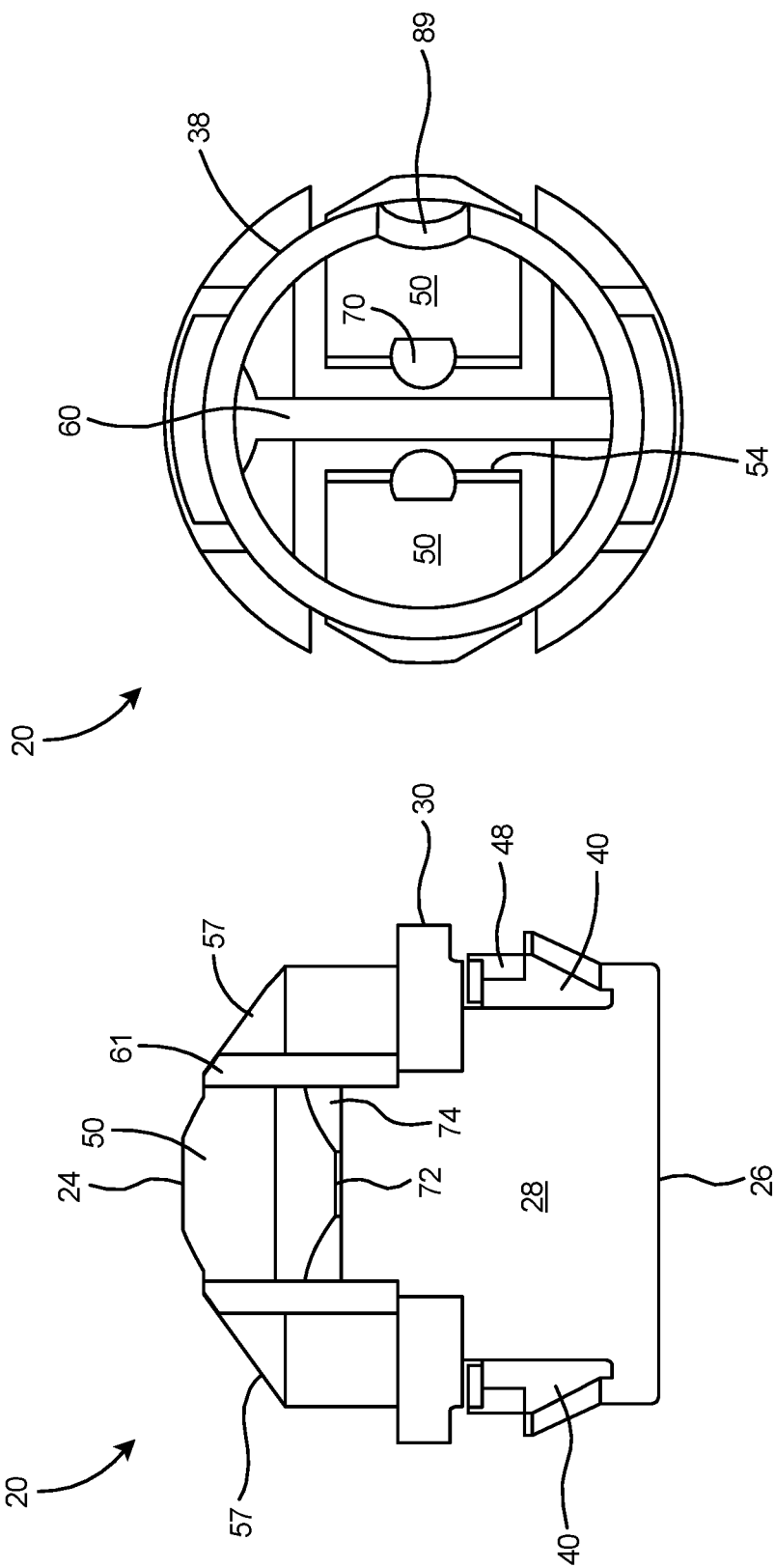

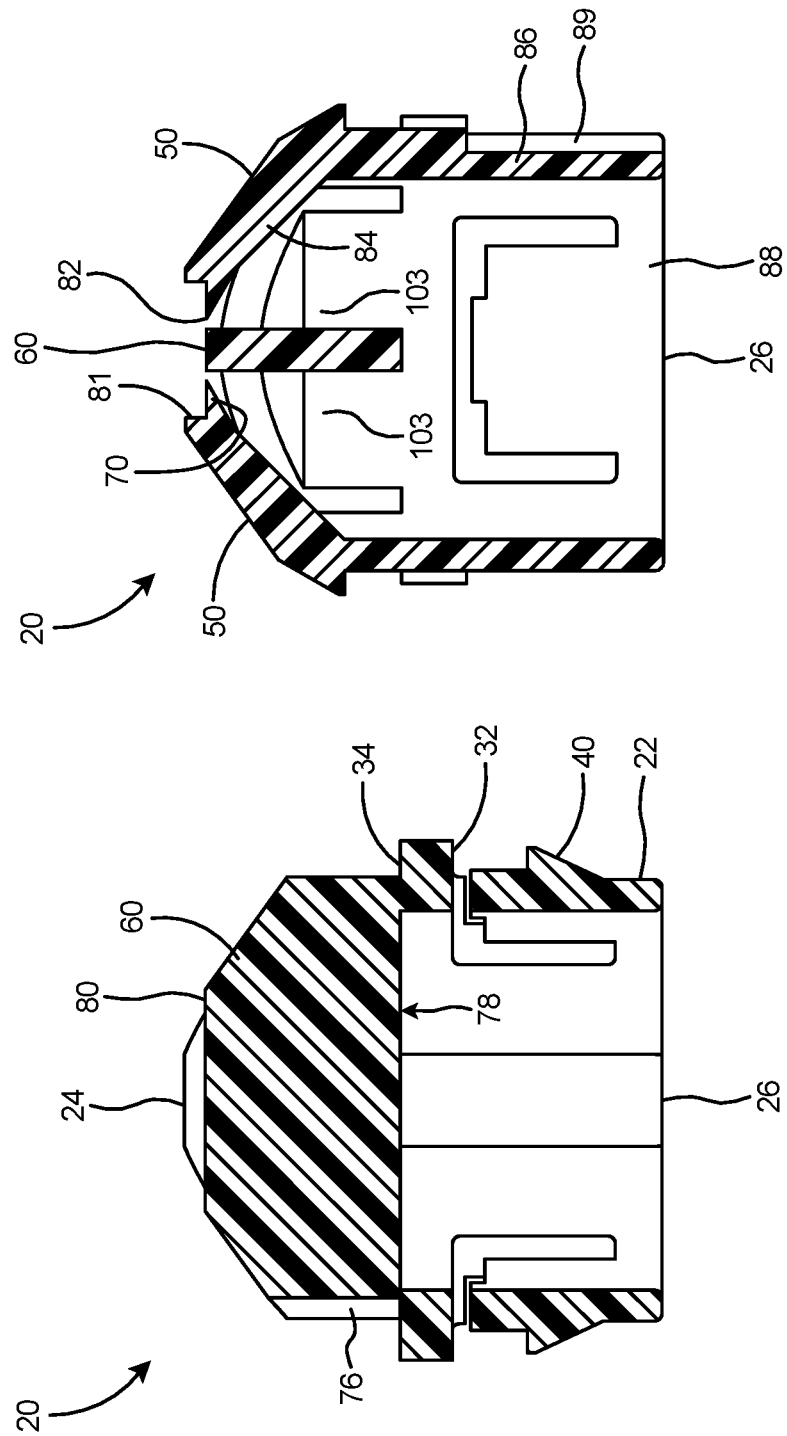

PUSH-IN ELECTRICAL CONNECTOR INSERTABLE FROM THE INSIDE OR OUTSIDE OF A JUNCTION BOX

CROSS-REFERENCE TO RELATED APPLICATIONS

This application claims priority to provisional U.S. Application No. 62/549,135, filed Aug. 23, 2017, the contents of which are incorporated herein by reference in their entirety.

FIELD OF THE INVENTION

The present invention relates to the connection of electrical cables to electrical boxes and panels and specifically to an electrical connector configured to connect to either the inner or outer wall of a junction box for securing one or more non-metallic electrical cables to the box.

BACKGROUND OF THE INVENTION

Non-metallic cable is commonly used in houses and other structures for supplying electricity to outlets, lights, and numerous other electrical devices. Although several types of push-in connectors have been proposed, they are typically installed from the outside of the box and their use is thus limited to a new-work situation in which the studs are exposed and the drywall has yet to be installed. However, it is frequently necessary to install additional cables in an old-work situation, wherein the studs are covered by drywall and typically a finished surface such as paint or wallpaper. In such a situation, it would be desirable to have a push-in connector that can be installed within a knockout from the interior of the box. Most preferably, to increase the flexibility of operation and enable the connector to be used in both a new-work and old-work situation, the connector would be capable of installation to either the inner wall of the box or to the outer wall of the box.

Accordingly, what is needed is a push-in electrical connector that may be inserted within a knockout of an electrical box or panel and which enables a user to easily connect one or more non-metallic electrical cables to the box or panel. The electrical connector should be of simple design, easy to operate, and should be simple to manufacture at a low per unit cost. The electrical connector should project a low profile on the interior of the box or panel when connected thereto. Furthermore, when connected to a knockout in a steel box, the electrical connector preferably would include a leading end that is capable of being oriented to avoid contact with the burrs that typically remain in the knockout of the steel box.

BRIEF SUMMARY OF THE INVENTION

The present invention is a push-in electrical connector for connecting one or more electrical cables at a knockout of an electrical junction box or panel. The electrical connector includes a substantially tubular connector body with a sidewall, a flange, an inner body portion extending from the flange to an inner end, and an outer body portion extending from the flange to an outer end. The inner body portion includes two flexible gripper jaws and an inner seat. The outer body portion includes two compressible arms and an outer seat. The electrical connector body may include a dividing wall for maintaining separation between electrical cables. The gripper jaws and compressible arms enable secure attachment of one or more cables to an electrical panel or box.

OBJECTS AND ADVANTAGES

A first object of the invention is to provide a push-in electrical connector that can be inserted by hand through a knockout of a junction box from either the outside or the inside of the box in order to connect one or more non-metallic electrical cables to an electrical outlet box or panel.

In those situations where the outside of the junction box is not easily accessible, such as in an old work situation where the sheet rock is already in place, the installer can simply place the push-in connector over a cable that has been pulled into the box and then push the connector over the cable until it snaps into the knockout aperture of the box.

A further object of the invention is to provide an electrical connector that is easy to operate and which requires minimum installation time.

A further object of the invention is to provide an electrical connector that snaps into an open knockout aperture via simple straight insertion into the knockout.

Another object of the invention is to provide an electrical connector that can be installed without the use of tools.

A further object of the invention is to provide an electrical connector that enables two cables to be installed into a knockout while maintaining separation between the cables.

A further object of the invention is to provide an electrical connector that includes a low profile outside the box when connected thereto, with a minimal portion of the connector projecting outside the box.

Another object of the present invention is to provide an electrical connector that provides proper strain relief to electrical cables, holding the cables fast within the connector and providing strong resistance to removal of the cables by a pulling force applied from outside the box.

A further object of the invention is to provide an electrical connector that may be manufactured at low cost.

A further object of the invention is to provide a means of orienting the connector to avoid burrs in the knockout aperture of the electrical box.

These and other objects and advantages of the present invention will be better understood by reading the following description along with reference to the drawings.

DESCRIPTION OF THE DRAWINGS

FIG. 2 is an end view of the electrical connector from the inside end.

FIG. 3 is a side view of the electrical connector.

FIG. 4 is a side view of the electrical connector rotated 90° from the view shown in FIG. 3.

FIG. 5 an end view of the electrical connector from the outside end.

FIG. 6 is a sectional view of the electrical connector taken along line 6-6 of FIG. 2.

FIG. 7 is a sectional view of the electrical connector taken along line 7-7 of FIG. 2.

DETAILED DESCRIPTION

Figure 1:
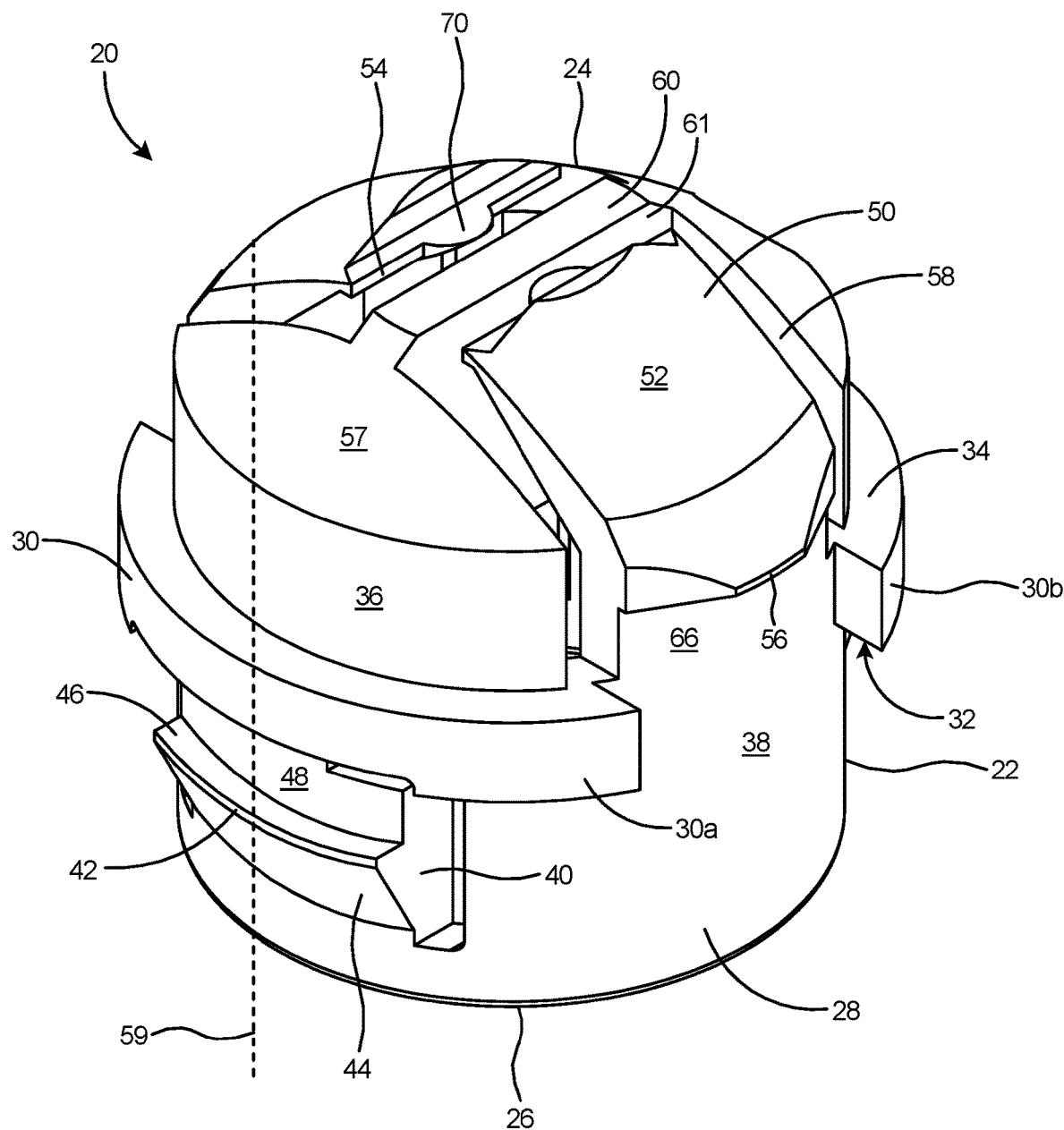
FIG. 1 is an isometric view of a first embodiment of an electrical connector for non-metallic cable according to the present invention as viewed from the inside end of the connector.

With reference to FIGS. 1 and 2 there is shown an electrical connector 20 or fitting for non-metallic cable according to the present invention. The electrical connector 20 includes a tubular connector body 22 with an inner end 24, an outer end 26, and an outer periphery 28. A flange 30 extends from the outer periphery 28 of the tubular connector body. The flange 30, substantially centered on the body 22 between the inner end 24 and outer end 26, includes an outer abutment surface 32 and an inner abutment surface 34. An inner body portion 36 extends from the flange 30 to the inner end 24 and an outer body portion 38 extends from the flange 30 to the outer end 26. The inner end 24 of the connector as used herein refers to the end of the connector that, once connected thereto, will reside within the electrical box or connected to the inner wall of the box. The outer end 26 of the connector as used herein refers to the end of the connector that, once connected thereto, will be the end that is outside of the electrical box or connected to the outer wall of the box.

Outer body portion 38 includes a compressible arm 40 including an arcuate extending ridge 42 having a tapered outer edge 44 and a trailing edge 46. An outer seat 48 is included on the outer body portion 38 between the flange 30 and the compressible arm 40. The inner body portion 36 includes a gripper jaw 50 having a top wall 52 and a gripper edge 54. A wing 56 extends outward from the gripper jaw 50.

Most preferably the electrical connector 20 includes two gripper jaws 50, two compressible arms 40, and the flange 30 is divided into two flange portions 30a and 30b. An end wall 57 extends from each flange portion 30a and 30b and extends substantially as far as the gripper jaws 50. A U-shaped slot 58 defines each gripper jaw 50. Each compressible arm 40 is in longitudinal alignment, as shown along longitudinal axis 59, with a corresponding flange portion 30a and 30b along the outer periphery 28 of the connector body 22.

Referring to FIGS. 2 and 3, a dividing wall 60 extends between the end walls 57 and across the gap 61 between the gripper jaws 50. A longitudinal slit 62 and lateral slit 64 extend through the outer body portion 38 to define the compressible arms 40. Preferably there are two compressible arms 40 located 180° apart on the outer periphery 28 of the tubular connector body 22. The wing 56 portion of the gripper jaws 50 and the inner abutment surface 34 of the flange 30 form an inner seat 66 on the outer periphery of the inner body portion 36. An outer seat 48 is formed along the outer periphery of the outer body portion 38 by the arcuate extending ridge 42 of the compressible arm 40 and the outer abutment surface 32 of the flange 30. A tab 70 extends from the gripper edge 54 of each gripper jaw 50 toward the dividing wall 60. The tabs 70 are preferably sharpened to a point.

With reference to FIGS. 4 and 5, the wing 56 portion of the gripper jaws 50 preferably includes a flat center portion 72 and two arcuate edges 74. Outer periphery 28 of connector body 22 preferably includes an inner notch 76 in the gripper jaw 50 of the inner body portion 36 as shown in FIG. 5. The inner notch 76 extends from the inner end 24 of the connector 20 to the inner abutment surface 34 of the flange 30.

Referring to FIGS. 6 and 7, dividing wall 60 includes a flat interior edge 78 that extends substantially from the inner abutment surface 34 of the flange 30 to a flat exterior edge 80. Each gripper jaw 50 includes a vertical wall Bland a distal edge or sharpened edge 82 extending from the longitudinal wall toward the dividing wall 60. The meaning of the term "sharpened edge" as used herein is that the edge 82, as shown in FIG. 7, is tapered from the vertical wall 81 to the distal edge 82, creating a sharpened edge extending across the gripper jaw 50 and that creates a point along the distal edge 82 of the gripper jaw. As a non-metallic (NM) cable is inserted through the connector 20, the sharpened edge will bite into the sheath of the inserted NM cable, grasp it firmly in the connector, and selectively resists removal of the cables by a pulling force applied from outside the box. The gripper jaws 50 include a longitudinally arcuate inclined surface 84 facing the interior of the connector body. The tubular electrical connector 20 includes a sidewall 86 and a bore 88 that extends within the sidewall 86 from the outer end 26 of the connector body 22 to the inclined surface 84 of the gripper jaws 50.

Figure 8:
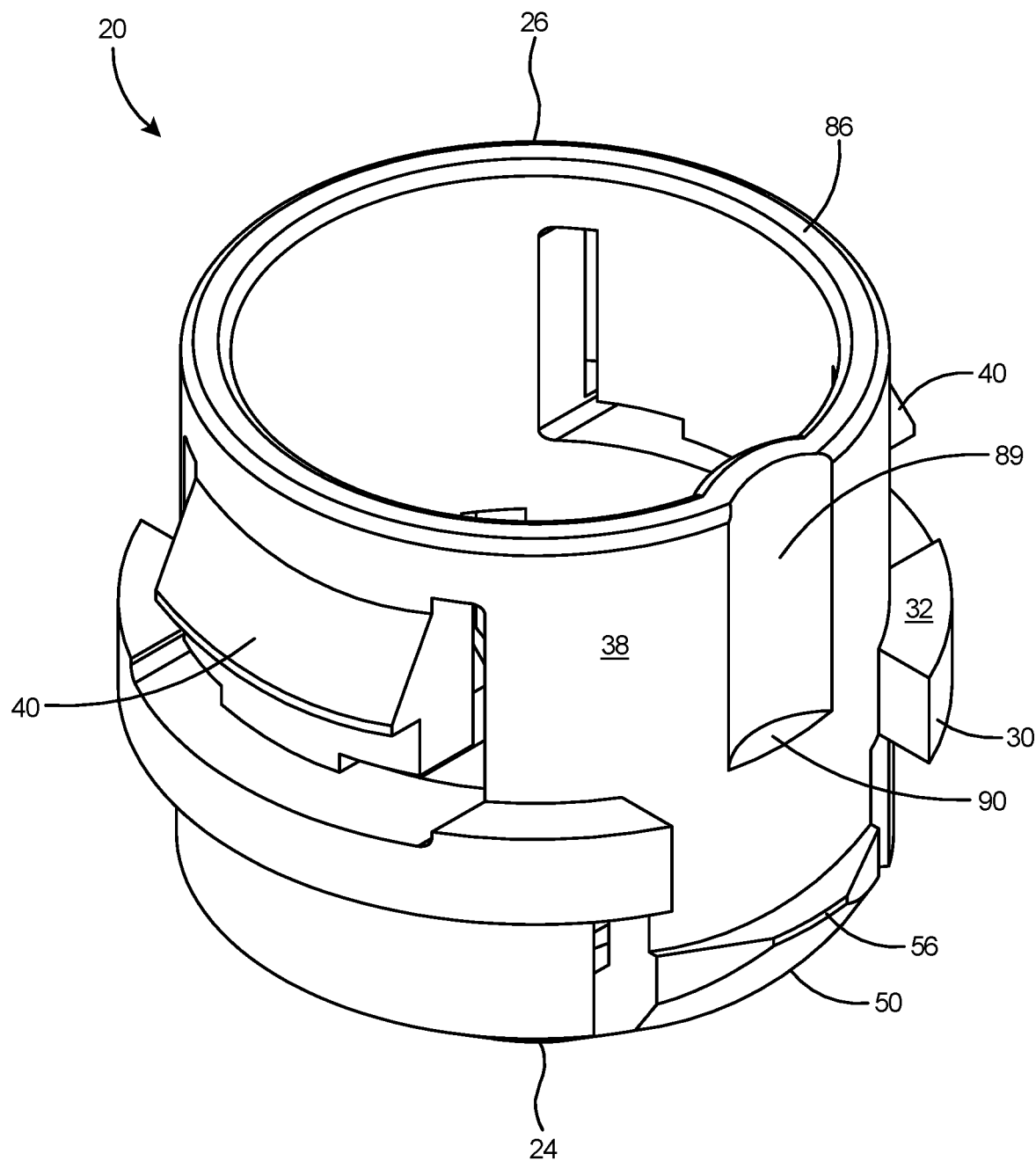
FIG. 8 is an isometric view of the push-in electrical connector for non-metallic cable according to the present invention as viewed from the outside end of the connector.

With reference to FIG. 8, an outer notch 89 preferably extends on the outer body portion 38 from the outer end 26 to the level of the outer abutment surface 32 of the flange 30. Outer notch 89 is formed by an inwardly arcuate portion 90 extending inward of the sidewall 86 of the connector body 22.

Figure 10:
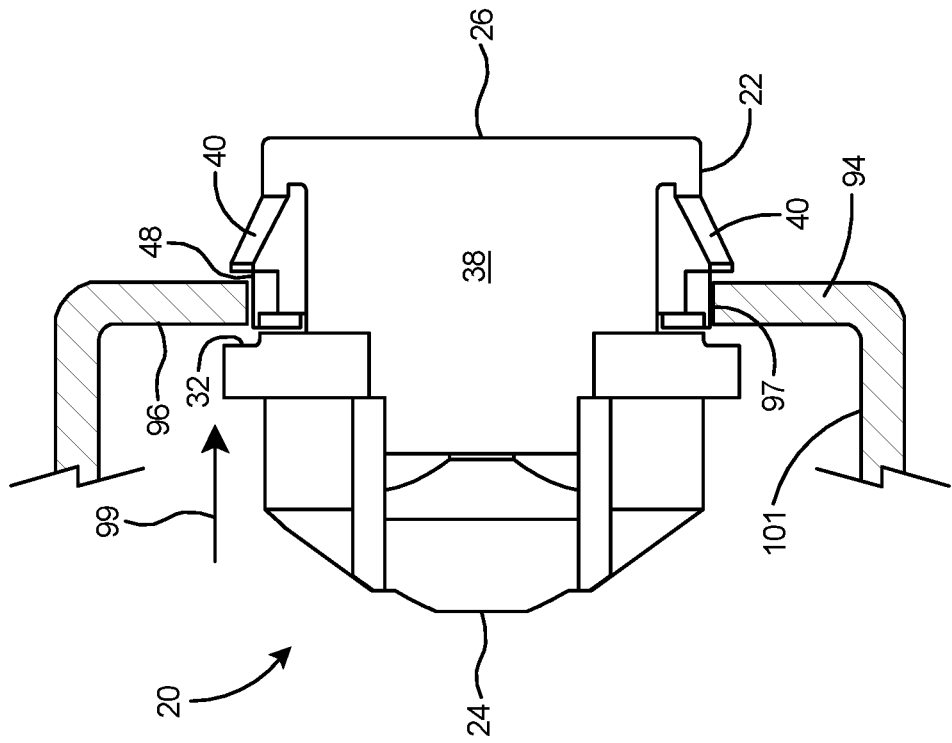
FIG. 10 is a side view of the electrical connector inserted into a knockout aperture from the inside of a junction box.
Figure 9:
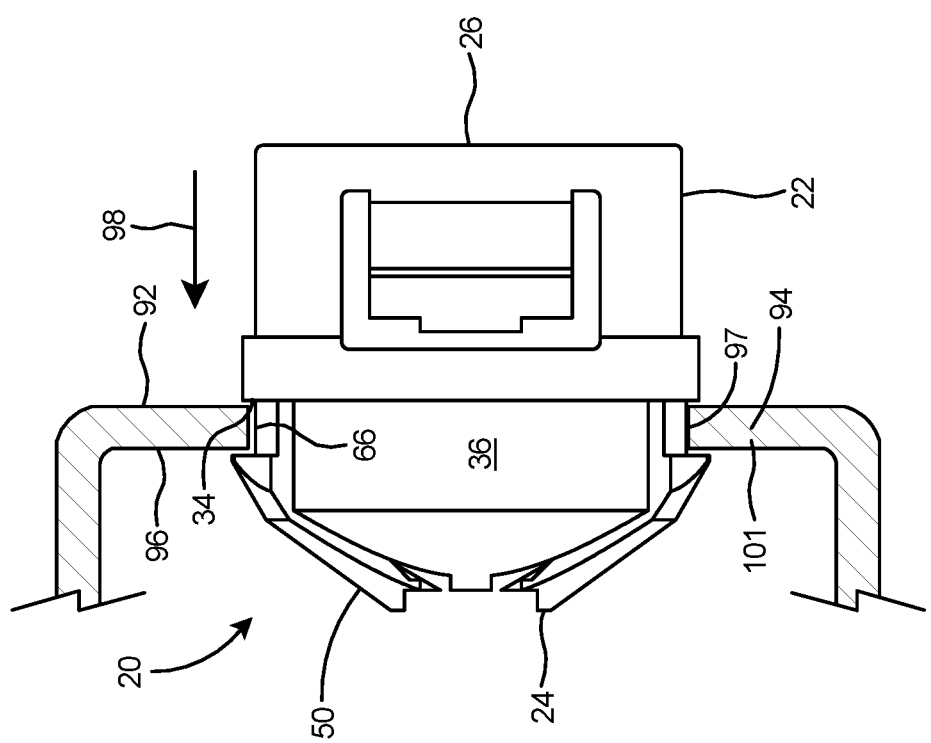
FIG. 9 is a side view of the electrical connector inserted into a knockout aperture from the outside of a junction box.

The electrical connector 20 enables an electrician to install the connector into a knockout aperture by simply pushing the connector from the outside 92 of an electrical box 94, as shown in FIG. 9, or from the inside 96 of an electrical box, as shown in FIG. 10. When inserting the connector into a knockout aperture, the inner notch 76 (see FIG. 2) and outer notch 89 (see FIG. 8) provide a means for accommodating the burr (not shown) which typically remains on the perimeter of the knockout aperture of the junction box wall after the knockout blank is removed from the box. An installer can rotate the connector until the burr slips into the respective notch, thereby enabling the inner body portion 36 or outer body portion 38 of the connector to slip through the aperture (as illustrated in FIGS. 9 and 10).

With reference to FIG. 9, in a new work situation, in which there no drywall installed around the box or in an old work situation where the outer walls of the electrical box are accessible, the connector 20 may be installed from the outside of the box. The connector 20 is oriented with the inner end 24 of the connector toward the outside 92 of the electrical box and is simply pushed straight or snapped into the open knockout 97 as shown in FIG. 9. The direction of insertion is as shown by arrow 98 in FIG. 9. As the connector is inserted within the knockout, the gripper jaws 50 flex inwardly to allow the inner end 24 to pass through the knockout. The connector is inserted until inner abutment surface 34 contacts the outside 92 of the box, after which the gripper jaws 50 snap outward to their unbiased position and the electrical box walls 101 are seated in the inner seat 66 of the connector.

Referring to FIG. 10, in an old work situation, wherein there is sheet rock already installed around the box 94, the connector 20 is placed within the electrical box 94 and is oriented with the outer end 26 of the connector toward the knockout 97. The electrical connector 20 is then simply pushed straight into the open knockout 97 from the interior of the electrical box. The direction of insertion is as shown by arrow 99 in FIG. 10. As the connector is inserted within the knockout, the compressible arms 40 flex inwardly to allow the outer end 26 to pass through the knockout. The connector is inserted until outer abutment surface 32 contacts the inside 96 of the box, after which the compression arms 40 snap outward to their unbiased position and the electrical box walls 101 are seated in the outer seat 48 of the connector.

As shown in FIG. 7, the electrical connector 20 provides two channels 103, one on each side of the dividing wall 60, for the insertion of electrical cables, enabling an installer to connect one or two cables (not shown) to the box. After a cable is pushed within a channel, the corresponding distal edge 82 of the gripper jaw 50 bites down onto the cable and holds it securely to the while simultaneously providing strong resistance to removal of the cables by a pulling force applied from outside the box.

Figure 11:
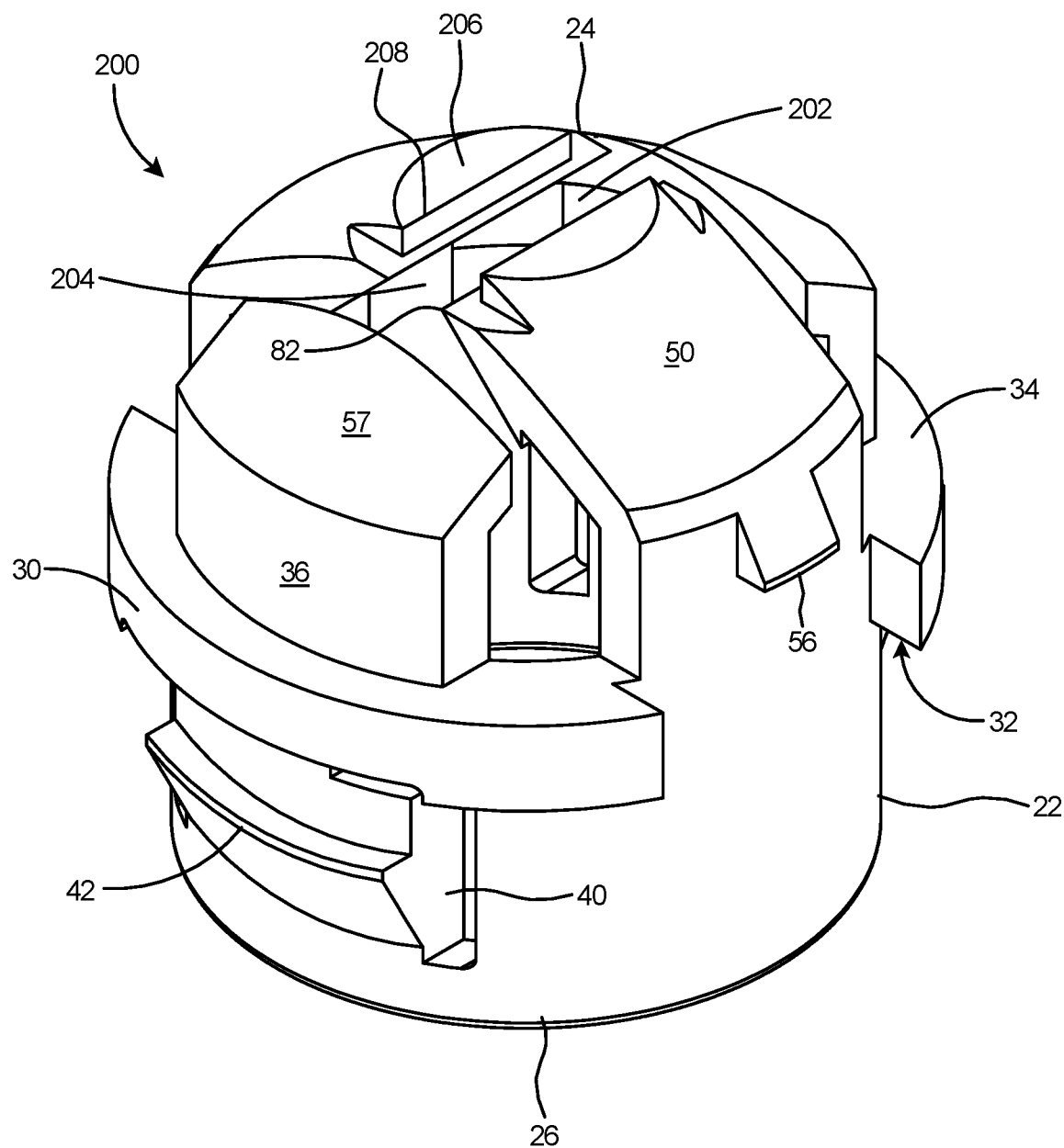
FIG. 11 is an isometric view of a second embodiment of an electrical connector for non-metallic cable according to the present invention as viewed from the inside end of the connector.
Figure 12:
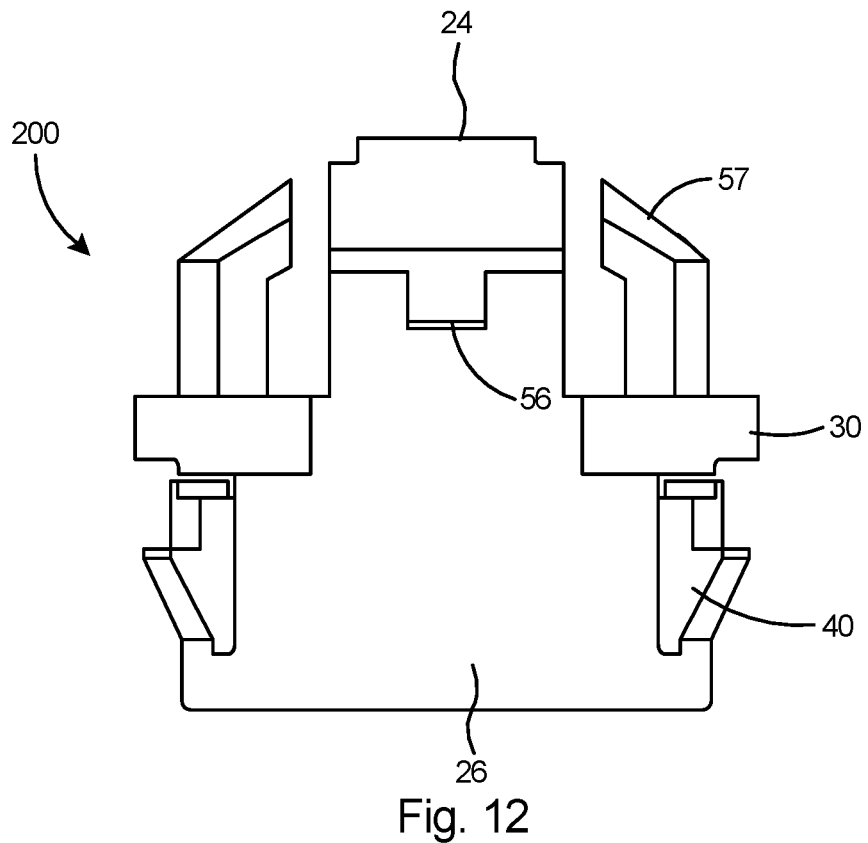
FIG. 12 is a side view of the electrical connector of FIG. 11.
Figure 13:
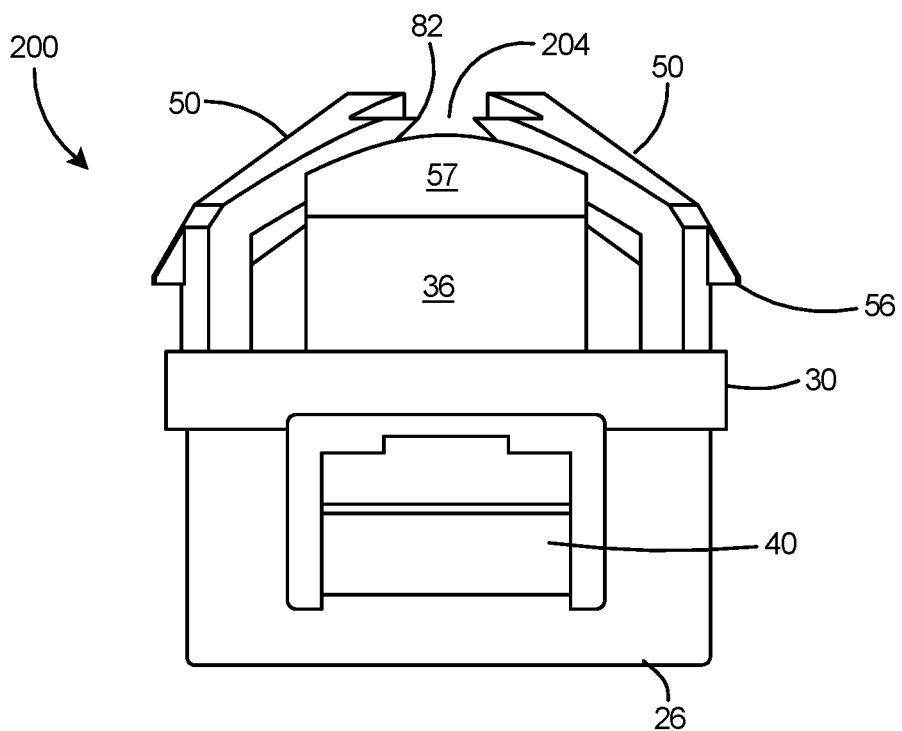
FIG. 13 is a side view of the electrical connector, with the view being 90° from the view shown in FIG. 12.
Figure 14:
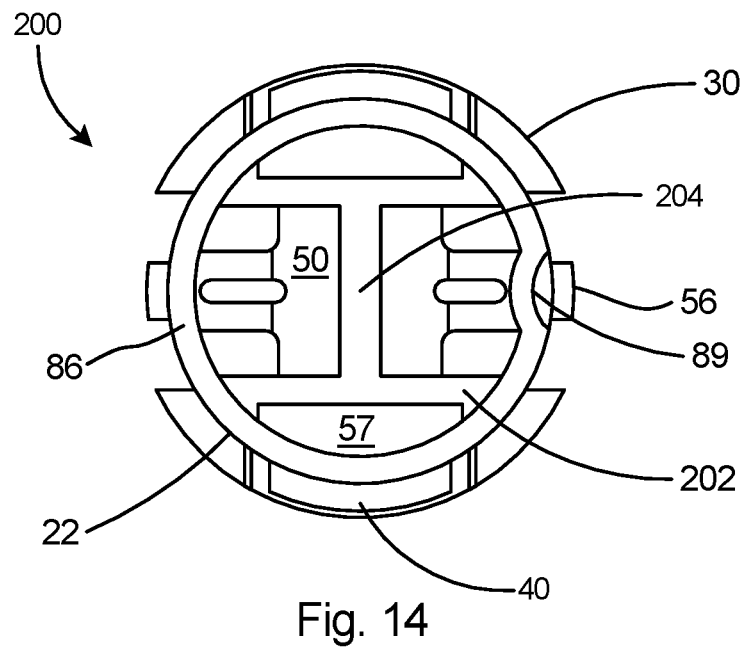
FIG. 14 is a bottom view of the electrical connector of FIG. 11.
Figure 15:
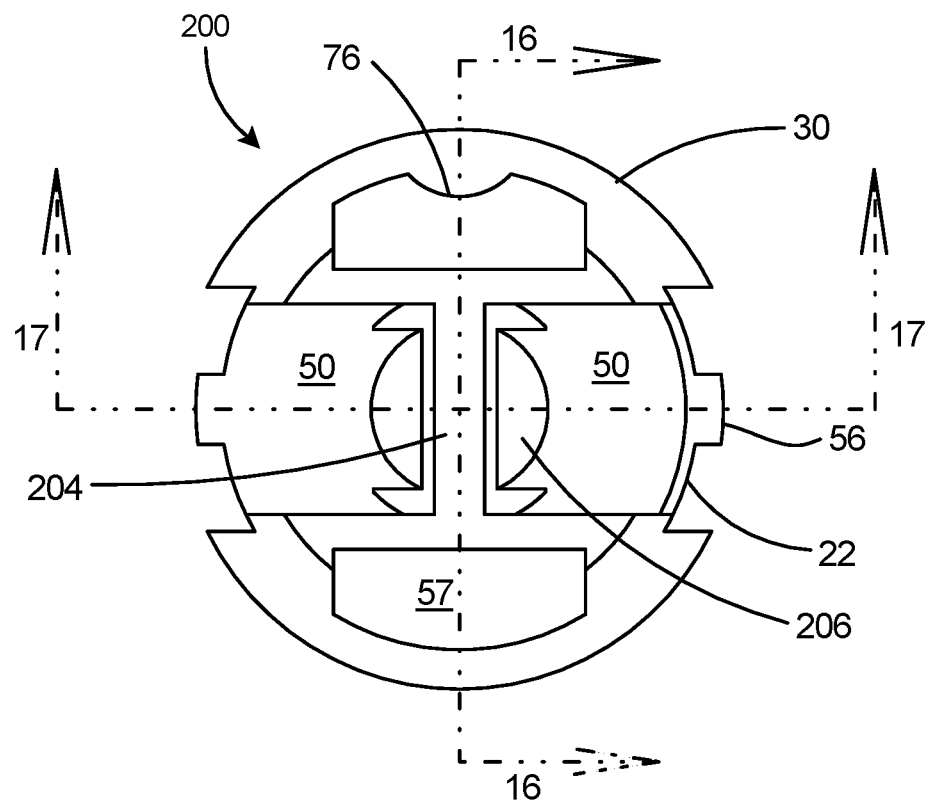
FIG. 15 a top view of the electrical connector of FIG. 11.
Figure 16:
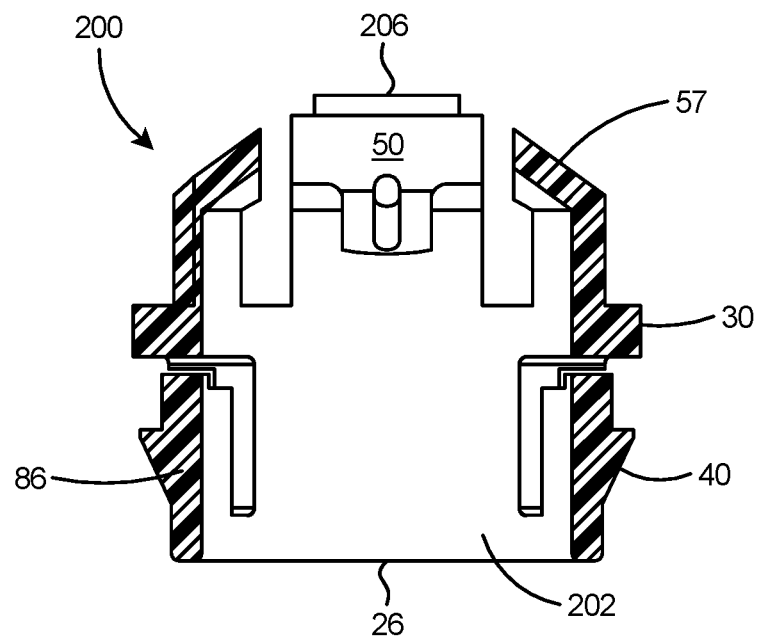
FIG. 16 is a sectional view of the electrical connector taken along line 16-16 of FIG. 15.
Figure 17:
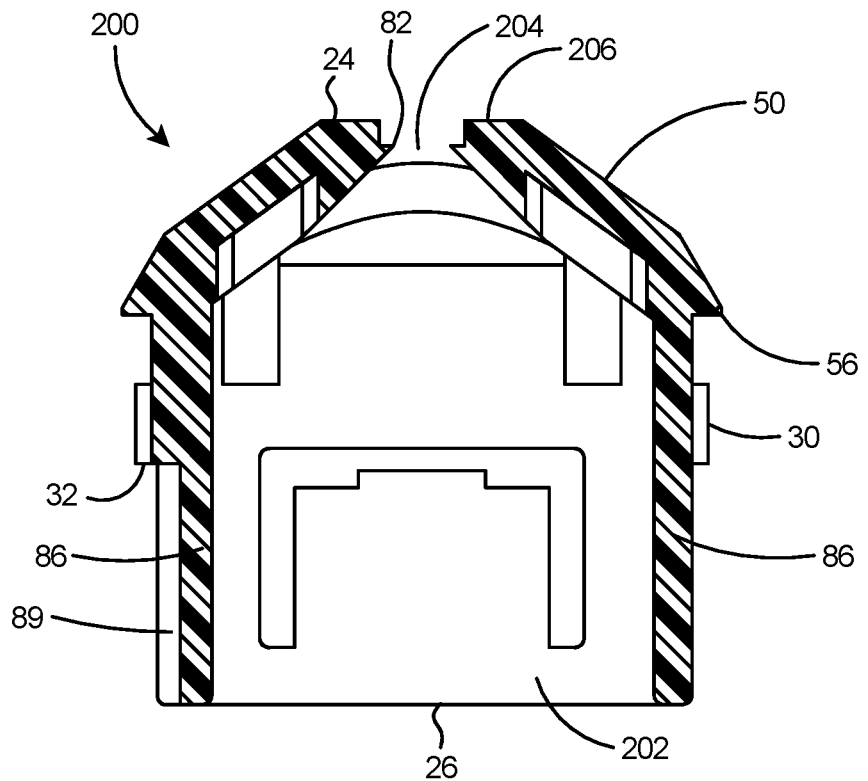
FIG. 17 is a sectional view of the electrical connector taken along line 17-17 of FIG. 16.

Referring to FIG. 11, there is shown a second embodiment of the electrical connector 200 for connection of a single cable at the knockout of an electrical box or panel. Similar to the first embodiment, the connector 200 includes an inner body portion 36 extending from the flange 30 to the inner end 24, an outer body portion 38 extending from the flange 30 to the outer end 26, two gripper jaws 50 and two compressible arms 40. Connector 200 includes an open bore 202 but no dividing wall. Gripper jaws 50 terminate in a distal edge 82 and are separated by a gap 204 at the inner end 24 of the connector 200. The gripper jaws 50 include a raised portion 206 extending outward from said distal edge 82, said raised portion 206 including a second edge 208. As in the first embodiment, the connector 200 can be secured to a junction box from the either the outside or the inside of the box (see FIGS. 9 and 10). An electrical cable (not shown) can then be inserted through the connector 200 until gripper jaws 50 lock the electrical cable in place between the jaws.

Figure 18:
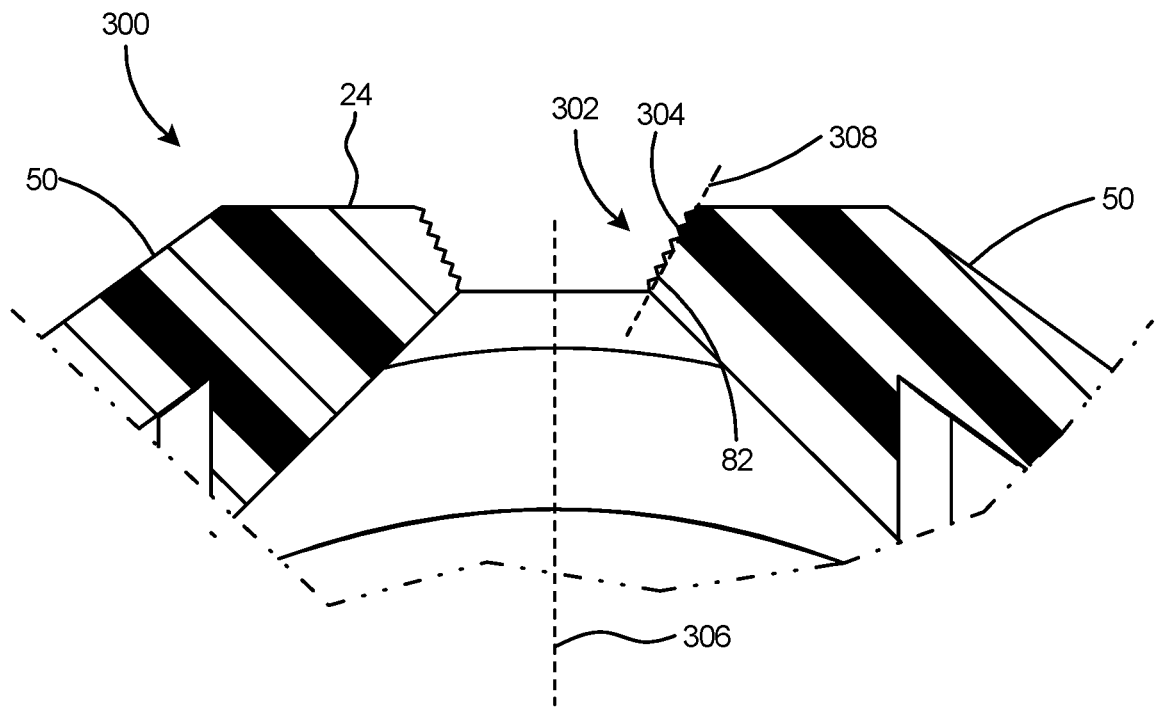
FIG. 18 is a detail view of the inner end of an alternate embodiment of the electrical connector showing an alternate arrangement on the distal end of the gripper jaws.

With reference to FIG. 18, there is shown an alternate embodiment at the inner end 24 of an electrical connector 300 depicting an alternate gripping arrangement 302 on the distal edge 82 of the gripper jaws 50. The alternate gripping arrangement 302 includes serrations 304 along the distal edge. The serrations 304 extend toward the longitudinal axis 306 through the connector 300. The serrations 304 extend along a linear base 308 that extends linearly across the distal edge 82.

Figure 19:
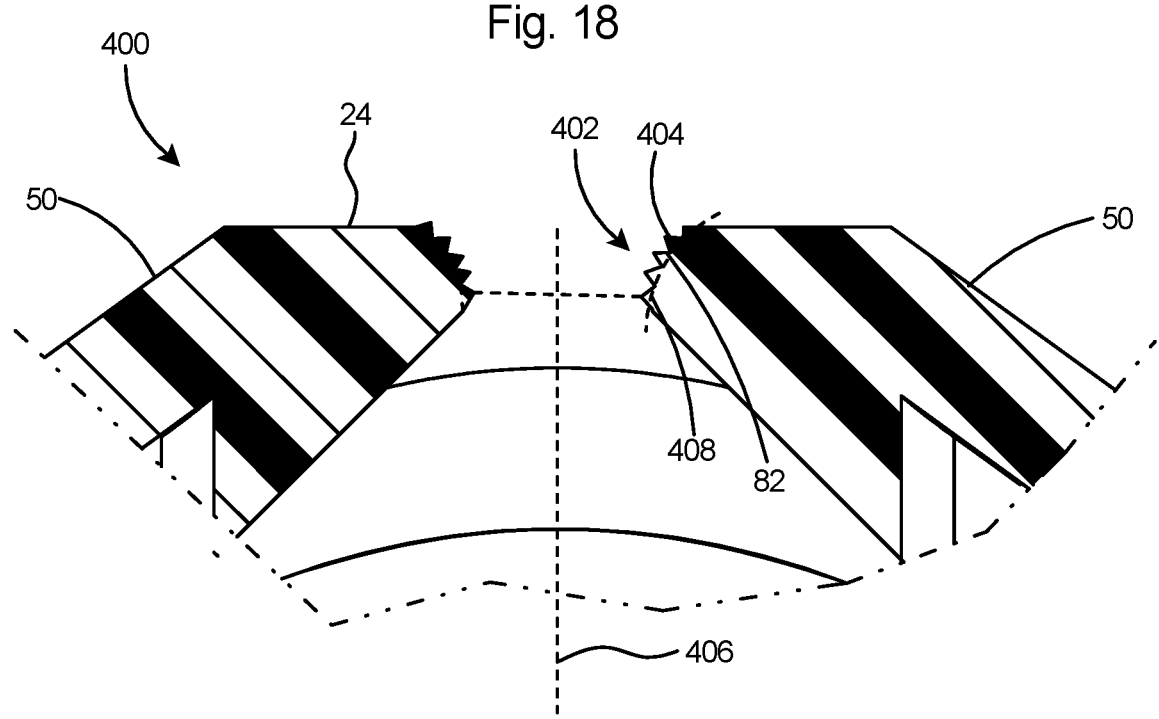
FIG. 19 is a detail view of the inner end of another alternate embodiment of the electrical connector showing another alternate arrangement on the distal end of the gripper jaws.

Referring to FIG. 19, another embodiment at the inner end 24 of an electrical connector 400 depicts another gripping arrangement 402 on the distal edge 82 of the gripper jaws 50. The alternate gripping arrangement 402 includes serrations 404 along the distal edge 82. The serrations 404 extend toward the longitudinal axis 406 through the connector 400. The serrations 404 include an arcuate base 408 that extends across the distal edge 82.

The electrical connector of the present invention is preferably constructed of plastic and most preferably is molded in one piece of plastic wherein the gripper jaws 50 and the compressible arms 40 can flex inwardly with respect to the sidewall 86 of the connector body 22. Appropriate plastic materials for construction of the connector include polycarbonate and polyvinyl chloride.

Although the description above contains many specific descriptions, materials, and dimensions, these should not be construed as limiting the scope of the invention but as merely providing illustrations of some of the presently preferred embodiments of this invention.

What is claimed is:
1. An electrical connector, comprising:
a tubular connector body including a sidewall, a bore, a flange, an inner end, and an outer end;
an inner body portion extending from said flange to said inner end;
an outer body portion extending from said flange to said outer end;
at least one gripper jaw extending from said inner body portion;
at least one compressible arm extending from said outer body portion;
a distal edge on said gripper jaw;
an outer notch on said outer body portion;
said outer notch extending from said outer end of said connector and terminating at an outer abutment surface of said flange, said outer notch forming an open channel from said outer end to said flange; and
said outer notch is an inwardly arcuate portion of the sidewall of the connector body.
2. The electrical connector of claim 1, further comprising an inner abutment surface on said flange.
3. The electrical connector of claim 2, further comprising:
an inner notch on said inner body portion; and
said inner notch extending from said inner end of said connector to said inner abutment surface of said flange.
4. The electrical connector of claim 2, further comprising:
a wing extending outward from said gripper jaw; and
said wing and said inner abutment surface of said flange forming an inner seat on said inner body portion of said connector body.
5. The electrical connector of claim 4, further comprising:
an outer seat extending circumferentially around a portion of said outer body portion of said connector; and
said outer seat extending between said flange and said compressible arm.
6. The electrical connector of claim 2, wherein said compressible arm further comprises:
a trailing edge; and
an arcuate extending edge.
7. The electrical connector of claim 2, further comprising:
a raised portion extending outward from said distal edge of said gripper jaw;
said raised portion including a second edge extending outward from said inner end; and
said distal edge is selected from the group comprising sharpened edge and serrations.

8. An electrical connector, comprising:
a tubular connector body including a sidewall, a bore, a flange, an inner end, and an outer end;
an inner body portion extending from said flange to said inner end;
an outer body portion extending from said flange to said outer end;
two gripper jaws extending from said inner body portion into said bore;
a gap between the gripper jaws;
at least one compressible arm extending from said outer body portion;
a distal edge on said gripper jaw;
a dividing wall on said connector body, said dividing wall including opposing sides and an exterior edge,
said dividing wall dividing said bore into separate channels; and
said exterior edge of said dividing wall located between the distal edge of said gripper jaws.

9. The electrical connector of claim 8, further comprising an inner abutment surface on said flange.

10. The electrical connector of claim 9, further comprising an outer abutment surface on said flange.

11. The electrical connector of claim 10, further comprising:
an outer notch on said outer body portion; and
said outer notch extending from said outer end of said connector to said outer abutment surface of said flange.

12. The electrical connector of claim 11, further comprising:
an inner notch on said inner body portion; and
said inner notch extending from said inner end of said connector to said inner abutment surface of said flange.

13. The electrical connector of claim 9, further comprising:
a wing extending outward from said gripper jaw; and
said wing and said inner abutment surface of said flange forming an inner seat on said inner body portion of said connector body.

14. The electrical connector of claim 9, further comprising:
an outer seat extending circumferentially around a portion of said outer body portion of said connector; and
said outer seat extending between said flange and said compressible arm.

15. The electrical connector of claim 8, wherein said compressible arm further comprises:
a trailing edge; and
an arcuate extending edge.

16. The electrical connector of claim 8, further comprising:
a raised portion extending outward from said distal edge of said gripper jaw;
said raised portion including a second edge extending outward from said inner end; and
said distal edge is selected from the group comprising sharpened edge and serrations.

17. The electrical connector of claim 9, further comprising a vertical wall on said gripper jaw.

18. An electrical connector, comprising:
a tubular connector body including a sidewall, a bore, a flange, an inner end, and an outer end;
an inner body portion extending from said flange to said inner end;
an outer body portion extending from said flange to said outer end;
at least one gripper jaw extending from said inner body portion;
at least one compressible arm extending from said outer body portion;
an edge on said gripper jaw;
an outer notch on said outer body portion;
said outer notch extending from said outer end of said connector and terminating at an outer abutment surface of said flange;
an inner notch on said inner body portion;
said inner notch extending from said inner end of said connector to an inner abutment surface of said flange; and
said outer notch is an inwardly arcuate portion of the sidewall of the connector body.

* * * * *